(12) United States Patent
    Chen (10) Patent No.: US 11,340,178 B1
(45) Date of Patent: *May 24, 2022

(54) DEVICES, SYSTEMS, AND METHODS FOR MEASURING RADIOACTIVE ISOTOPE PRODUCTION IN BULK

(71) Applicant: Westinghouse Electric Company LLC, Cranberry Township, PA (US)

(72) Inventor: Jianwei Chen, Wexford, PA (US)

(73) Assignee: Westinghouse Electric Company LLC, Cranberry Township, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/076,500

(22) Filed: Oct. 21, 2020

Related U.S. Application Data

(63) Continuation-in-part of application No. 17/060,316, filed on Oct. 1, 2020.

(51) Int. Cl.
    *H05G 1/00*     (2006.01)
    *G01N 23/223*   (2006.01)
    *G01N 23/095*   (2018.01)

(52) U.S. Cl.
    CPC ......... *G01N 23/223* (2013.01); *G01N 23/095* (2018.02)

(58) Field of Classification Search
    CPC ............................. G01N 23/223; G01N 23/095
    See application file for complete search history.

(56) References Cited

U.S. PATENT DOCUMENTS 3,141,977 A    7/1964   Fratantuno

FOREIGN PATENT DOCUMENTS

GB         884349 A     12/1961

OTHER PUBLICATIONS

Eberle et al., "Applications of radioactive tracer technology in the real-time measurement of wear and corrosion," Wear, vol. 259, pp. 1462-1471. (Year: 2005).*
International Search Report and Written Opinion for International PCT Application No. PCT/US2021/071940, dated Feb. 8, 2022.

* cited by examiner

*Primary Examiner* — Kiho Kim
(74) *Attorney, Agent, or Firm* — K&L Gates LLP (57) ABSTRACT

A device configured to measure radioactivity emitted by a plurality of radionuclides is disclosed herein. The device includes a gamma detector and a source cage with an outer ring that defines a volume and includes an orientation feature and a plurality of holes configured to receive a radionuclide of the plurality of radionuclides. The device also includes a frame that includes an arm and a central rod, wherein the arm is configured to be coupled to the outer ring and includes an orientation pin. The central rod can be positioned relative to the volume when the arm is coupled to the outer ring of source cage. The orientation feature of the source cage is configured to engage the orientation pin of the arm and, when the orientation pin engages the orientation feature, the central rod is in a predetermined location relative to the volume.

20 Claims, 7 Drawing Sheets

DEVICES, SYSTEMS, AND METHODS FOR MEASURING RADIOACTIVE ISOTOPE PRODUCTION IN BULK

CROSS-REFERENCE

The present application is a continuation-in-part claiming priority under 35 U.S.C. § 120 to U.S. Non-Provisional patent application Ser. No. 17/060,316 titled DEVICES, SYSTEMS, AND METHODS FOR MEASURING RADIOACTIVE ISOTOPE PRODUCTION IN BULK, filed on Oct. 1, 2020, the disclosure of which is hereby incorporated by reference in its entirety.

FIELD

The present disclosure is generally related to nuclear power generation and, more particularly, is directed to an improved device configured to measure radioactive isotope production in bulk.

SUMMARY

The following summary is provided to facilitate an understanding of some of the innovative features unique to the aspects disclosed herein, and is not intended to be a full description. A full appreciation of the various aspects can be gained by taking the entire specification, claims, and abstract as a whole.

In various aspects, a device configured to measure radioactivity emitted by a plurality of radionuclides is disclosed. The device includes a gamma detector configured to measure the radioactivity emitted by the plurality of radionuclides. The device further includes a source cage including an outer ring that defines a volume, wherein the outer ring includes a plurality of holes. Each hole of the plurality of holes is configured to receive a radionuclide of the plurality of radionuclides. The outer ring further includes an orientation a feature. The device further includes a frame including: an arm configured to be coupled to the outer ring of the source cage, wherein the arm includes an orientation pin; and a central rod coupled to the arm. The central rod is configured to be positioned relative to the volume of the source cage when the arm is coupled to the outer ring of source cage. The orientation feature of the source cage is configured to engage the orientation pin of the arm. The central rod is positioned in a predetermined location relative to the volume when the orientation pin engages the orientation feature.

In various aspects, a method of measuring radioactivity emitted by a plurality of radionuclides is disclosed. The method uses a source cage including an outer ring that defines a volume and a plurality of holes, wherein each hole of the plurality of holes is configured to receive a radionuclide of the plurality of radionuclides, and a frame including an arm coupled to a central rod, wherein the central rod is coupled to a gamma detector, wherein the outer ring includes a orientation feature, wherein the arm includes an orientation pin configured to engage the orientation feature, and wherein the central rod is configured to be positioned in a predetermined location relative to the volume when the orientation pin and the orientation feature are engaged. The method includes: coupling the arm to the outer ring of the source cage; arranging the arm and the central rod until the central rod is be positioned in the predetermined location relative to the volume; engaging the orientation pin of the arm and the orientation feature of the outer ring of the source cage; inserting a radionuclide of the plurality of radionuclides into a hole of the plurality of holes of the outer ring of the source cage; taking a baseline measurement of radioactivity emitted by the inserted radionuclide using the gamma detector; removing the radionuclide of the plurality of radionuclides from the hole of the plurality of holes of the outer ring of the source cage; inserting each radionuclide of the plurality of radionuclides into the plurality of holes of the outer ring of the source cage; taking a collective measurement of radioactivity emitted by the plurality of radionuclides; and dividing the collective measurement by the number of radionuclides of the plurality of radionuclides to determine an average measurement of radioactivity emitted by each radionuclide of the plurality of radionuclides.

In various aspects, a device configured to measure radioactivity emitted by a plurality of radionuclides coupled to a source cage that defines a volume, wherein the source cage includes an orientation feature is disclosed. The device includes: an arm configured to be coupled to the source cage, wherein the arm includes an orientation component that corresponds to the orientation feature of the source cage; and a central rod coupled to the arm, wherein the central rod is configured to be coupled to a gamma detector configured to measure the radioactivity emitted by the plurality of radionuclides, and wherein the central rod is configured to be positioned relative to the volume of the source cage when the arm is coupled to the source cage; wherein the orientation feature of the source cage is indicative of a predetermined location relative to the orientation component on the source cage, and wherein the predetermined location relative to the orientation component on the source cage corresponds to a predetermined location relative to the central rod relative to the volume.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention.

BRIEF DESCRIPTION OF THE DRAWINGS

Various features of the aspects described herein are set forth with particularity in the appended claims. The various aspects, however, both as to organization and methods of operation, together with advantages thereof, may be understood in accordance with the following description taken in conjunction with the accompanying drawings as follows:

Corresponding reference characters indicate corresponding parts throughout the several views. The exemplifications set out herein illustrate various aspects of the invention, in one form, and such exemplifications are not to be construed as limiting the scope of the invention in any manner.

DETAILED DESCRIPTION

Numerous specific details are set forth to provide a thorough understanding of the overall structure, function, manufacture, and use of the aspects as described in the disclosure and illustrated in the accompanying drawings. Well-known operations, components, and elements have not been described in detail so as not to obscure the aspects described in the specification. The reader will understand that the aspects described and illustrated herein are non-limiting examples, and thus it can be appreciated that the specific structural and functional details disclosed herein may be representative and illustrative. Variations and changes thereto may be made without departing from the scope of the claims. Furthermore, it is to be understood that such terms as "forward", "rearward", "left", "right", "upwardly", "downwardly", and the like are words of convenience and are not to be construed as limiting terms. Furthermore, it is to be understood that such terms as "forward", "rearward", "left", "right", "upwardly", "downwardly", and the like are words of convenience and are not to be construed as limiting terms.

In the following description, like reference characters designate like or corresponding parts throughout the several views of the drawings. Also in the following description, it is to be understood that such terms as "forward", "rearward", "left", "right", "upwardly", "downwardly", and the like are words of convenience and are not to be construed as limiting terms.

Before explaining various aspects of the articulated manipulator in detail, it should be noted that the illustrative examples are not limited in application or use to the details of construction and arrangement of parts illustrated in the accompanying drawings and description. The illustrative examples may be implemented or incorporated in other aspects, variations, and modifications, and may be practiced or carried out in various ways. Further, unless otherwise indicated, the terms and expressions employed herein have been chosen for the purpose of describing the illustrative examples for the convenience of the reader and are not for the purpose of limitation thereof. Also, it will be appreciated that one or more of the following-described aspects, expressions of aspects, and/or examples, can be combined with any one or more of the other following-described aspects, expressions of aspects, and/or examples.

The present disclosure is directed to devices, systems, and methods to measure radioactive isotope production capsules in bulk. Radionuclides (e.g. Cobalt 60, Molybdenum-99, Cesium-137, Iodine-131, Strontium-90, Technetium-99, Americium-241, and/or atomic variations of Plutonium, Uranium, Radium, Radon, Thorium, Tritium) possess a wide-variety of useful applications. For example, radionuclides can be used to improve the safety of medical devices, assist in the treatment of cancer, and reduce pathogens in foods and other products. However, radioactive isotopes emit harmful gamma rays that can be carcinogenic to humans depending on the degree of exposure. This can complicate the production, processing, and handling of radionuclides. In spite of these inherent risks, industry continues to produce and ship large quantities of radionuclides, expanding their many uses in an attempt to realize their full potential.

In order to ensure the safe shipment of large quantities of radionuclides, manufacturers must comply with a number of governmental regulations and contractual obligations regarding the amount of gamma rays emitted by each radionuclide capsule of a shipment, as well as the entire shipment of radionuclide capsules. Although the present disclosure discusses radionuclides configured as capsules, it shall be appreciated that the disclosed inventions can be implemented—or easily modified—to measure the radioactivity emitted by radionuclides in any number of geometric configurations, not necessarily capsulated radionuclides. As such, the term "capsule" shall not be construed as a geometrical limitation of the radionuclides.

Traditionally, each radionuclide capsule was individually evaluated. However, this is time consuming and highly inefficient, especially for larger shipments, which can include hundreds—or even thousands—of radionuclide capsules. Thus, conventional methods of shipping radionuclides are tedious, inefficient, and prone to human error. These problems only increase for radionuclides that must be submerged in water to shelter or shield personnel from dangerous gamma rays. Accordingly, there is a need for devices, systems, and methods to efficiently measure radioactive isotope production capsules in bulk. Such devices, systems, and methods would save money and time, increase safety, and improve manufacturer compliance to governmental regulations and contractual obligations.

Figure 1:
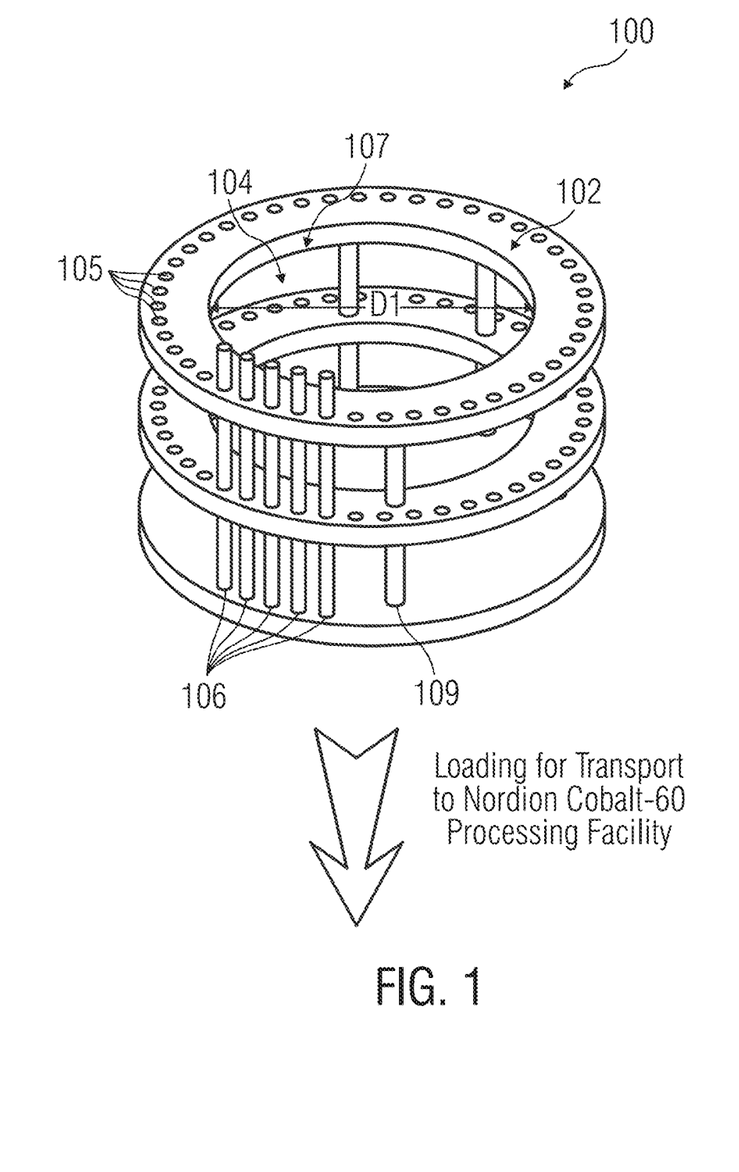
FIG. 1 illustrates a perspective view of a source cage of a device configured to measure radioactivity emitted by a plurality of radionuclides in bulk, in accordance with at least one non-limiting aspect of the present disclosure.

Referring now to FIG. 1, an perspective view of a source cage 100 of a device configured to measure radioactivity emitted by a plurality of radionuclides 106 in bulk is depicted in accordance with at least one non-limiting aspect of the present disclosure. The source cage 100 of FIG. 1 is configured to safely store and ship a large shipment of radionuclides. For example, the source cage 100 of FIG. 1 can be used to ship 48 radionuclide capsules. However, it shall be appreciated that the capacity of the source cage 100 of FIG. 1 can be easily scaled or otherwise reconfigured to accommodate more or less radionuclides, in any desired form, as long as the storage geometry remains three-hundred-and-sixty-degree symmetric with respect to its centerline. As such, it would be advantageous to streamline the number of measurements required to generate an accurate amount of gamma rays emitted by a plurality of radionuclides 106 stored in the source cage 100 of FIG. 1, because doing so would enable a technician of the source cage 100 to quickly verify compliance to governmental regulations and contractual obligations.

In further reference to FIG. 1, the source cage 100 of FIG. 1 can include one or more outer rings 102 that define a volume 104. According to the non-limiting aspect of FIG. 1, the outer rings 102 are circular and thus, the volume 104 is cylindrical. However, the present disclosure contemplates other non-limiting aspects wherein the source cage 100 can include any number of geometric structures and volumes, as long as the geometric structures and volumes remain three-hundred-and-sixty-degree symmetric with respect to their centerlines. The outer rings 104 of the source cage 100 of FIG. 1 can further include a plurality of holes 105, wherein each hole 105 of the plurality of holes 105 can be configured to receive a radionuclide 106 of the plurality of radionuclides 106. However, the present disclosure contemplates other means of receiving and securing the radionuclides 106. For example, the source cage 100 of FIG. 1 can additionally and/or alternatively include gripping components, cradles, and/or other structural elements to either assist or replace the plurality of holes 105 depicted in the non-limiting embodiment of FIG. 1. These structural components most simply secure the radionuclides 106 at a predetermined position, i.e., centerline, of the source cage 100.

Notably, the source cage 100 of FIG. 1 can include a three-hundred-and-sixty degree form, such that each radionuclide is equidistant from a center point of a circular plane defined by an upper surface of the outer ring 102. For example, the source cage 100 of FIG. 100 can include an inner diameter D1. The plurality of holes 105 can be defined in the outer ring 106 such that, when installed, each radionuclide 106 of the plurality of radionuclides 106 is positioned the same distance away from the center point of the cylindrical volume 104, or in other words, the center point of the inner diameter D1. However, the radionuclides 106 can be configured to be the same distance from any reference point on a source cage 100 of any other geometrical configuration. It shall be appreciated that the cylindrical source cage 100 of FIG. 1 is merely depicted for ease of illustration.

According to the non-limiting aspect of FIG. 1, the radionuclides 106 can be structured as elongated rods. Accordingly, the source cage 100 can include three outer rings 102 supported by one or more standoff rods 109 configured to orient and support the outer rings 102 such that the plurality of holes 105 of a first outer ring 102 aligns with the plurality of holes 105 of a second outer ring 102. Each of the plurality of holes 105 can include a circular bore configured to accommodate the circular cross-section of each of the radionuclides 106. This allows for the rod-shaped radionuclides 106 to be properly inserted into the holes 105 and supported within each outer ring 102 of the source cage 100 of FIG. 1. However, the present disclosure contemplates other non-limiting aspects, wherein the radionuclides 106 include varying shapes and sizes. As previously discussed, the present disclosure contemplates other non-limiting aspects, wherein the source cage 106 can include components of varying shapes and configurations to effectively accommodate and secure any shape of radionuclide 106. Once the radionuclides 106 are inserted into the holes 105, the source cage 100 can be submerged in water for testing and/or processing.

In further reference to FIG. 1, the source cage 100 can further include an orientation feature 107, such as a notch, a slot, an opening, and/or the like. In the non-limiting aspect of FIG. 1, the orientation feature 107 comprises an orientation notch configured to receive an orientation pin 209 (FIG. 2) of a frame 200 (FIG. 2) configured to be coupled to the source cage 100. As will be discussed in further detail, the orientation notch 107 is specifically positioned such that a gamma detector 207 (FIG. 2) coupled to the central rod 208 (FIG. 2) of the frame 200 (FIG. 2) is positioned in a predetermined location within the cylindrical volume 104. Although the source cage 100 of FIG. 1 can include a single orientation notch 107, the present disclosure contemplates other non-limiting aspects in which the source cage 100 can include several orientation notches 107, or any combination of other geometric features 107, which can allow a technician to position the gamma detector 207 (FIG. 2) coupled to the central rod 208 (FIG. 2) of the frame 200 (FIG. 2) in a variety of predetermined positions within the cylindrical volume 104. This can allow the technician to reorient and reposition the gamma detector 207 (FIG. 2) to accommodate for margins of error, or enhance measurement accuracy. According to still other non-limiting aspects, the source cage can include a pre-existing geometrical feature that the gamma detector 207 (FIG. 2) can be configured to be positioned about. For example, in some non-limiting aspects, the source cage can include a centerpiece that protrudes from the bottom of the source cage through the center of cylindrical volume 104. Accordingly, a gamma detector—such as a self-powered detector 302 (FIG. 3)—can be strategically positioned about the centerpiece, as desired, instead of a gamma detector—such as an ion chamber detector 207 (FIG. 2)—being suspended within the cylindrical volume 104 via a central rod 208 (FIG. 2) of a frame 200 (FIG. 2).

Figure 2:
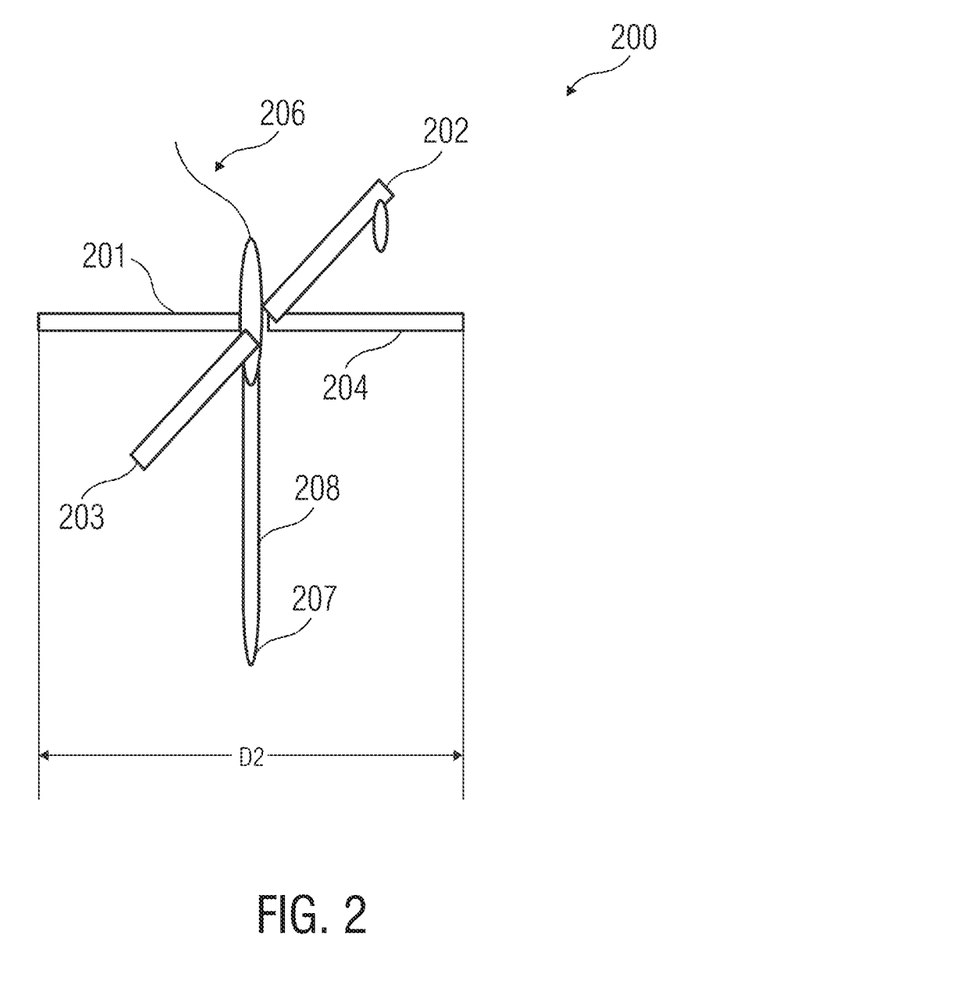
FIG. 2 illustrates a perspective view of a frame of a device configured to measure radioactivity emitted by a plurality of radionuclides in bulk, in accordance with at least one non-limiting aspect of the present disclosure.

Referring now to FIG. 2, a perspective view of a frame 200 of a device configured to measure radioactivity emitted by a plurality of radionuclides 106 (FIG. 1) in bulk is depicted in accordance with at least one aspect of the present disclosure. According to the non-limiting aspect of FIG. 2, the frame 200 can include a central rod 208, as well as a first arm 201, a second arm 202, a third arm 203, and a fourth arm 204. The arms 201, 202, 203, 204 can be specifically configured to couple to the outer ring 102 of the source cage 100. For example, the first arm 201 and the fourth arm 204 can collectively define a frame diameter D2 that is larger than the inner diameter D1 (FIG. 1) of the source cage 100 (FIG. 1). Accordingly, the first arm 201 and fourth arm 204 can support the frame 200 such that the central rod 208 is suspended within the cylindrical volume 104 (FIG. 1) of the source cage 100 (FIG. 1). However, it shall be appreciated that the frame 200 can include any number of arms 201, 202, 203, 204 in varying configurations to achieve the same result. For example, according to another non-limiting aspect of the present disclosure, the frame 200 can include a single arm 201 configured to be clamped to the outer ring 102 (FIG. 1) and suspend the central rod 208 within the cylindrical volume 104 (FIG. 1) of the source cage 100 (FIG. 1).

Still referring to FIG. 2 and in accordance with some non-limiting aspects of the present disclosure, the arms 201, 202, 203, 204 of the frame 200 can be configured to move relative to the outer ring 102 (FIG. 1) of the source cage 100 (FIG. 1) once they are installed. For example, the arms 201, 202, 203, 204 can include additional structural components such as hinges, rollers, tracks, and/or the like which can be used to angle the arms 201, 202, 203, 204 relative to a plane defined by a top surface of the outer ring 102. Accordingly, the frame 200 and, more specifically, the arms 201, 202, 203, 204, can be articulated and thus, capable of movings the central rod 208 between a number of predetermined locations within the cylindrical volume 104 (FIG. 1).

In further reference to FIG. 2, the central rod 208 of the frame 200 can be configured to suspend a gamma detector 207 within the cylindrical volume 104 (FIG. 1) of the source cage 100 (FIG. 1), wherein the gamma detector 107 will be exposed to gamma rays emitted by the plurality of radionuclides 106 (FIG. 1). According to the non-limiting aspect of FIG. 2, the gamma detector 207 can be integral to—and positioned at an end of—the central rod 208. The central rod 208 can be further configured to include and/or house a signal cable 206, such that signals can be routed from the gamma detector 207 to a remotely located data acquisition unit. This can allow a technician to safely monitor a measure of detected gamma rays that are emitted by at least one of the plurality of radionuclides 106 (FIG. 1). It shall be appreciated that, although the non-limiting aspect of FIG. 2 includes a signal cable 206 to rout signals from the gamma detector 207 to a remotely located data acquisition unit, other non-limiting aspects include gamma detectors 207 that can be configured for wireless communication.

According to other non-limiting aspects of the present disclosure the central rod 208 of FIG. 2 can be further configured to be coupled to an external gamma detector 207. For example, the gamma detector 207 can include a farmer ion chamber installed on a sleeve configured to be installed over and around an end of the central rod 208. The sleeve can include a housing specifically configured to position the gamma detector 207 at a desired orientation relative to the central rod 208, such as the center line. According to still other non-limiting embodiments of the present disclosure, the gamma detector 207 can further include a self-powered detector (e.g. platinum). The self-powered detector can be configured to be wound around an end of the central rod 208, forming a tight, spiral configuration, as depicted in FIG. 3.

Although the non-limiting aspect of FIG. 2 depicts a gamma detector 207 coupled to the end of the central rod 208, it shall be appreciated that, according to other non-limiting aspects, any number of detectors can be coupled to the central rod 208 depending on user preference and/or intended application of the frame 200. For example, the central rod 208 is configured such that a technician can couple any number or spectroscopes or non-invasive test equipment to it in a similar manner to the gamma detector 207. Accordingly, a technician can utilize the frame 200 of FIG. 2 to perform any number of tests on a bulk shipment of radionuclides, thereby ensuring compliance with any number of governmental regulations and/or contractual obligations. Alternatively and/or additionally, it shall be appreciated that, in still other non-limiting aspects, the central rod 208 can be simultaneously configured to accommodate any number of gamma detectors 207, spectroscopes, and/or non-invasive test equipment. This can provide the frame 200 with a degree of modularity and flexibility of use, enabling a technician to perform any number of tests on a bulk shipment of radionuclides using the same frame 200 by simple swapping out the gamma detector for another spectroscope and/or piece of test equipment.

Figure 3:
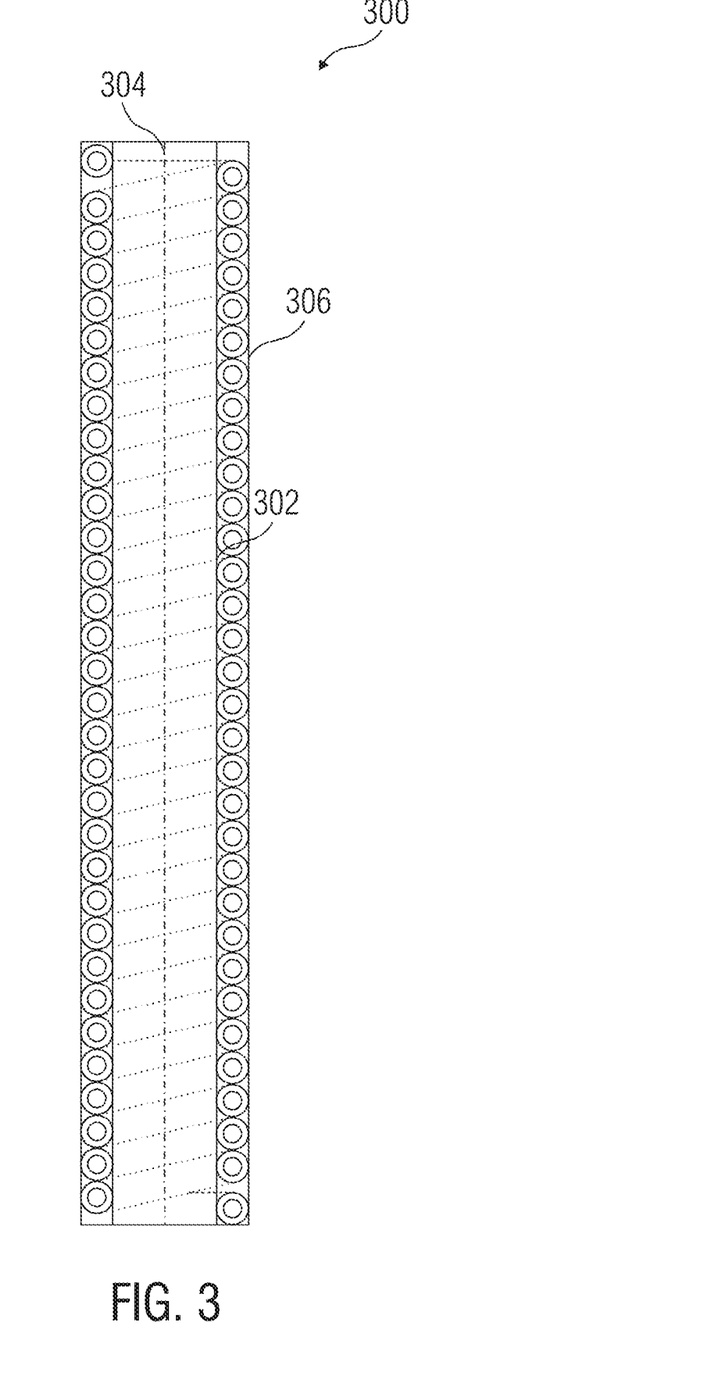
FIG. 3 illustrates a sectioned view of a gamma detector configured to be coupled to the frame of FIG. 2, in accordance with at least one non-limiting aspect of the present disclosure.

Referring now to FIG. 3, a sectioned view of a gamma detector 300 configured to be coupled to the frame of FIG. 2 is depicted in accordance with at least one non-limiting aspect of the present disclosure. According to the non-limiting aspect of FIG. 3, the gamma detector 300 can include a self-powered detector 302 positioned around an inner tube 304 and an outer tube 306 positioned. The central rod 208 (FIG. 2) can constitute the inner tube 304. However, in still other non-limiting aspects of the present disclosure, the gamma detector 300 can include a separate tube, which serves as a sleeve configured to be coupled to the central rod 208 (FIG. 2). The outer tube 306, self-powered detector 302, and the inner tube 304 can be specifically configured to ensure that the self-powered detector 302 does not move relative to the central rode 208 (FIG. 2), as the orientation of the self-powered detector 302 relative to the plurality of radionuclides 106 (FIG. 1) can affect the measurement.

In further reference to FIG. 3, the self-powered detector 302 can be used to measure an amount of gamma rays emitted by the plurality of radionuclides 106 (FIG. 1). The self-powered detector 302 can measure an amount of gamma rays because an electrical current is induced throughout the spiral configuration when the self-powered detector 302 is in the proximity of a radionuclide. The electrical current induced within the self-powered detector 302 can be measured in a number of different ways. For example, the sensitivity of the self-powered detector 302 can be calculated via testing, and will vary depending on the amount of electrical current generated given the length of the self-powered detector 302 based on a known quantity of gamma ray exposure. As long as the self-powered detector 302 is properly positioned within the cylindrical volume 104 (FIG. 1) of the source cage 100 (FIG. 1), the calculated sensitivity can be used to measure the collective gamma rays emitted by the plurality of radionuclides 106 (FIG. 1). Although the self-powered detector 302 of FIG. 3 is configured to measure gamma rays, according to other aspects of the present disclosure, the self-powered detector 302 can be configured to measure other types of radiation. Additionally, although the gamma detector 300 of FIG. 3 can include a self-powered detector 302 configured to measure gamma rays, in still other non-limiting aspects contemplate the gamma detector 300 can include any number of radiation detectors (e.g. a farmer ion chamber and/or the like).

Figure 4:
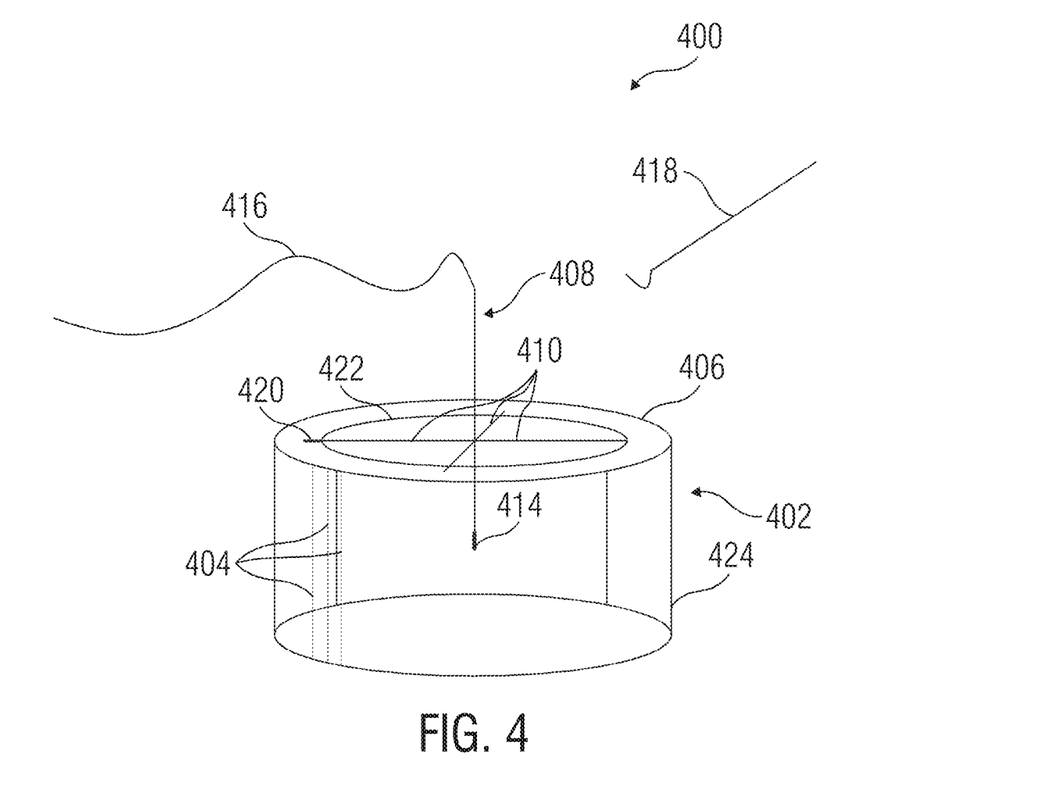
FIG. 4 illustrates a perspective view of a device configured to measure radioactivity emitted by a plurality of radionuclides in bulk, in accordance with at least one non-limiting aspect of the present disclosure.

Referring now to FIG. 4, a perspective view of a device 400 configured to measure radioactivity emitted by a plurality of radionuclides 404 in bulk is depicted in accordance with at least one non-limiting aspect of the present disclosure. According to the non-limiting aspect of FIG. 4, the device 40 can include a source cage 402 and a frame 408 similar to the source cage 100 and frame 200 depicted in FIGS. 1 and 2, respectively. Generally, FIG. 4 illustrates how previously disclosed elements can be integrated into a device 400 configured to measure radioactivity emitted by a plurality of radionuclides 41 in bulk. For example, a technician might use the device 400 of FIG. 4 to store and ship a large number of radionuclides 404—a contractual deliverable—to a receiving customer. Alternatively and/or additionally, a technician might use the device 400 of FIG. 4 to store and ship a large number of radionuclides 404 internally. Regardless, the device 400 of FIG. 4 can be used to efficiently ensure that a shipment of radionuclides 404—and more specifically, the radioactivity emitted by the radionuclides 404—complies with governmental regulations and/or contractual obligations.

As previously discussed, the orientation and/or the position of a gamma detector 414 relative to the plurality of radionuclides 404 can affect the integrity of a measurement. Accordingly, the gamma detector 414 can be optimally positioned within the cylindrical volume defined by the outer ring 406 and therefore, can receive the desired exposure to radioactivity emitted by the plurality of radionuclides 404. As can be seen in the non-limiting aspect of FIG. 4, the arms 410 of the frame 408 are configured to rest on the outer ring 406 of the source cage 402. As such, the central rod 412 can suspend a gamma detector 414 within the cylindrical volume defined by the outer ring 46. It shall be appreciated that the position of the gamma detector 414 within the cylindrical volume defined by the outer ring 406 can be adjusted by modifying a length of the central rod 46. As such, the present disclosure contemplates non-limiting aspects wherein the central rod 412 can be telescopically configured.

Alternatively and/or additionally, an orientation notch 422 of the source cage 402 can be configured to receive and secure an orientation pin 420 of the frame 408. According to the non-limiting aspect of FIG. 4, the gamma detector 414 can be positioned in a predetermined location relative to the cylindrical volume defined by the outer ring 406 when the orientation pin 420 of the frame 408 is received by the orientation notch 422 of the source cage 402. As such, a technician does not need to waste time arranging the frame 408 and the source cage 402 to properly position the gamma detector 414 within the cylindrical volume. Instead, the technician can align the orientation pin 420 with the orientation notch 422. As an added bonus, the frame 408 can be secured relative to the source cage 402 when the orientation pin 420 is received by the orientation notch 422, thereby ensuring the desired configuration will not be perturbed. Although the non-limiting aspect of FIG. 4 can include an orientation pin 420 and an orientation notch 422, other non-limiting aspects of the present disclosure include any number of mechanical components and/or features configured to properly orient and secure the frame 408 to the source cage 402. For example, a variety of mating geometries, interacting components, visual markings, and/or combinations thereof can be implemented, depending on the intended application and/or specific technician preference.

According to still other non-limiting aspects of the present disclosure, the source cage 402 of FIG. 4 can include more than one orientation notch 422, wherein each orientation notch 422, when engaged with the orientation pin 420 of the frame 408, will orient the gamma detector 414 in a particular predetermined position of a plurality of predetermined positions within the volume defined by the outer ring 406. This can provide a technician with the flexibility to adjust the position of the gamma detector 414 as desired, while retaining the aforementioned ease-of-use and efficiencies.

Still referring to FIG. 4, the device 400 can be calibrated and/or reconfigured to optimize the integrity of a measurement, as desired. For example, a technician can utilize the frame 408 and source cage 402 of the device to initially orient the gamma detector 414 within the internal volume defined by the outer ring 406. Once the gamma detector 414 is initially positioned, the technician can install a single radionuclide 414 of a plurality of radionuclides 414 into the source cage 402 and take a baseline measurement of the radioactivity emitted by the single radionuclide 414. The technician may proceed to install each radionuclide 414 of the plurality of radionuclides 414 into the source cage 402 and take a collective measurement of radioactivity emitted by the plurality of radionuclides 414. The technician can then compare the collective measurement to the baseline measurement and determine a correction factor based, at least in part, on the comparison. For example, if the baseline measurement of the single radionuclide 414 was one Curie, the technician might expect that the collective measurement would be 48 Curies. However, if the collective measurement significantly diverges from the what would be expected based on the baseline measurement, the technician might determine a correction factor, which can account for an acceptable margin of error. Accordingly, the technician might decide to reposition the gamma detector 414 within the cylindrical volume based, at least in part, on the determined correction factor. The aforementioned structural features of the device 400 of FIG. 4 can assist the technician in easily making these adjustments and therefore, facilitate a more efficient acquisition of accurate data associated with the anticipated shipment.

In other words, the device 400 can be capable of enhancing the efficiency of radioactivity measurements due to its symmetrical geometry. For example, in the non-limiting aspect of FIG. 4, the source cage 402 includes a three-hundred and sixty degree geometry that is symmetric relative to a radial centerline of the plane defined by the outer ring 406. As described above, when the source cage 402 is loaded with a number ("X") of radionuclides 404, the device 400 can achieve a detection efficiency, which can be defined as the calibrated efficiency ("E") multiplied by the number of installed radionuclides, or X*E.

In further reference to FIG. 4, a number of standoff rods 424 can support the outer rings 406 of the source cage 402. However, the standoff rods 424 can interfere with the radiation exposure of the gamma detector 414, thereby imposing a larger calibration error than desired. If such standoff rods 424, or any other structural feature of the device 400 generate an unacceptable calibration error, multiple approaches can be taken to account for the error and efficiently calibrate the device 400. For example, an accurate calibration efficiency that accounts for the standoffs 424 can be determined either experimentally, or via simulation. Alternatively and/or additionally, the source cage 402 can be modified to include a larger number of standoffs 424, wherein each standoff 42 includes a smaller diameter. Still, in other non-limiting aspects, the source cage 402 can be modified to include a circumferential support plate which provides structural stability independent of the standoff rods 424 without interfering with the radiation exposure of the gamma detector 414.

As previously discussed, radionuclides must be carefully controlled at all times to avoid worker overexposure to radiation. Such caution can introduce constraints on the handling of radionuclides, which can only increase inefficiencies and complicate bulk measurements and shipments. Accordingly, the device 400 of FIG. 4 can be further configured to be submerged in water, which can shield personnel from hazardous exposure. For example, the device 400 of FIG. 4 can be utilized for both underwater and/or wet-source-storage models. As such, the device 400 an include a manipulating arm 418 including a predetermined length that can allow a technician to engage the orientation pin and the orientation notch from afar (e.g. above the surface of the water). It shall be appreciated that the length can further be configured to position the technician a predetermined distance away from the plurality of radionuclides. Alternatively and/or additionally, the frame 400 and specifically, the arms 410 of the frame 400 can be robotically configured for autonomous repositioning relative to the source cage 402. According to some non-limiting aspects, the frame 400 can further include a position sensor, which can provide real-time feedback regarding the position of gamma detector 414 relative to the radionuclides 404.

Additionally, the gamma detector 414 of FIG. 4 can be coupled to a signal cable 416 that can be either integral to or routed to the surface via the central rod 412. For example, the signal cable 416 can communicate signals from the gamma detector 414 to a data acquisition unit located above the water and a safe distance away from the radionuclides 404. It shall be appreciated that, although the non-limiting aspect of FIG. 4 includes a signal cable 416 to rout signals from the gamma detector 414 to a remotely located data acquisition unit, other non-limiting aspects include gamma detectors 414 that can be configured for wireless communication.

Figure 5:
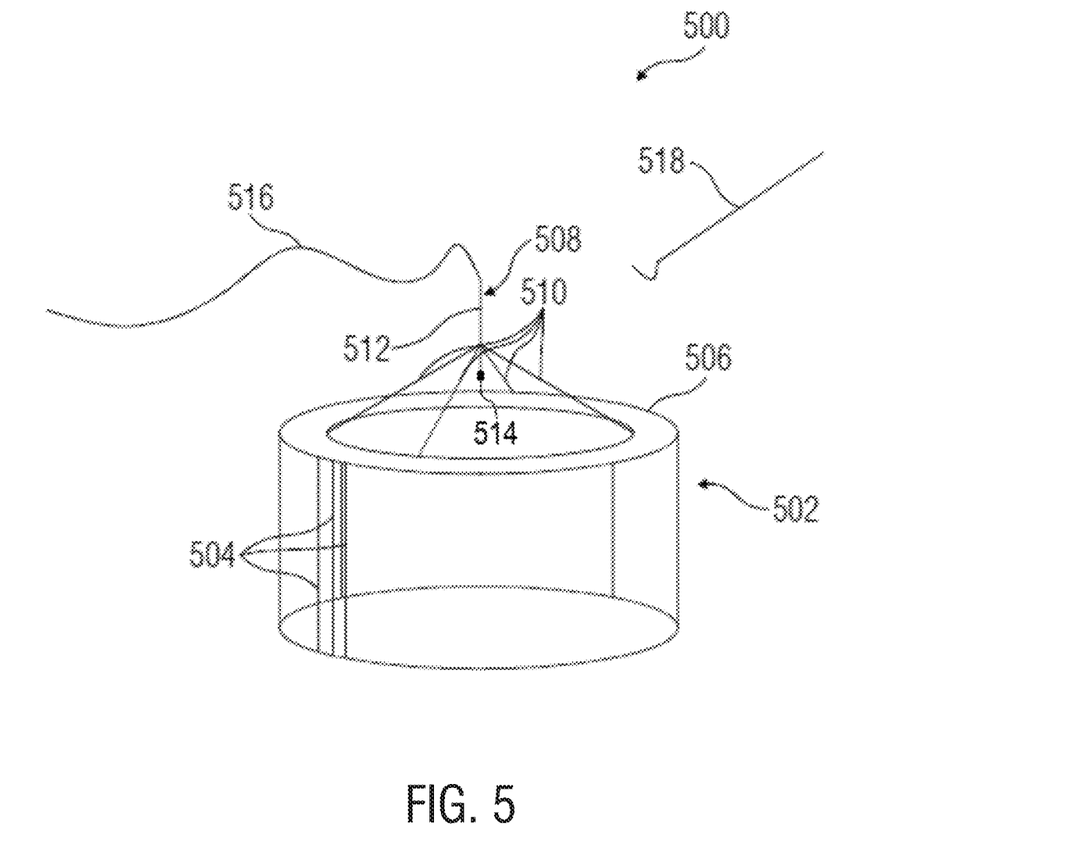
FIG. 5 illustrates a perspective view of another device configured to measure radioactivity emitted by a plurality of radionuclides in bulk, in accordance with at least one non-limiting aspect of the present disclosure.

Referring now to FIG. 5, a perspective view of another device 500 configured to measure radioactivity emitted by a plurality of radionuclides in bulk is depicted in accordance with at least one non-limiting aspect of the present disclosure. According to the non-limiting aspect of FIG. 5, the device 500 can be configured substantially similar to the device 400 of FIG. 4. However, the device 500 of FIG. 5 can further include one or more arms 510 movably configured relative to the source cage 502. Accordingly, the frame 508 can be repositioned relative to the source cage 502. It shall be appreciated that the arms 510 can include any number of structural components and/or features that can facilitate this functionality. For example, the device 500 of FIG. 5 can include arms 510 configured with locking hinges, which can be manipulated from a safe distance. Alternatively and/or additionally, the arms 510 can include sliding tracks and/or rollers to accomplish the same effect. A manipulating arm 518 can be used to manipulate the arms 510 from above the water and at a safe distance. Alternatively and/or additionally, the frame 500 and specifically, the arms 510 of the frame 500 can be robotically configured for autonomous repositioning relative to the source cage 502. According to some non-limiting aspects, the frame 500 can further include a position sensor, which can provide real-time feedback regarding the position of gamma detector 514 relative to the radionuclides 504.

In further reference to FIG. 5, the arms 510 can be manipulated to adjust the frame 508—and specifically, the central rod 512—relative to the source cage 502. This can subsequently reposition the gamma detector 514 relative to the cylindrical volume defined by the outer ring 506 and therefore, the orientation and/or the position of the gamma detector 514 relative to the plurality of radionuclides 404. For example, according to the non-limiting aspect of FIG. 5, the gamma detector 545 can be positioned outside of the cylindrical volume defined by the outer ring 506, such that the gamma detector 545 is suspended above the outer ring 506 of the source cage 502. This can be particularly useful for source cages 502 that include geometrical features within the cylindrical volume, such as a centerpiece where the central rod would otherwise be positioned. However, it shall be appreciated that the present disclosure contemplates other non-limiting aspects wherein the gamma detector 514 can be positioned within the cylindrical volume. In some non-limiting aspects, the central rod 512 can be telescoping or otherwise adjustable to accommodate source cages 502 of varying designs and configurations and thus, allow for flexibility regarding the gamma detector 514 position. As such, the arms 510 of the frame 508 depicted in FIG. 5 can be manipulated to affect the integrity of a measurement. Such features enhance the customization of the device 500 configuration and thus, provide more versatility for implementing technicians. In other words, the arms 510 can be used instead of—or in conjunction with—an orientation pin and orientation slot opening to optimize efficiency and improve compliance of bulk radionuclide shipments.

Figure 6:
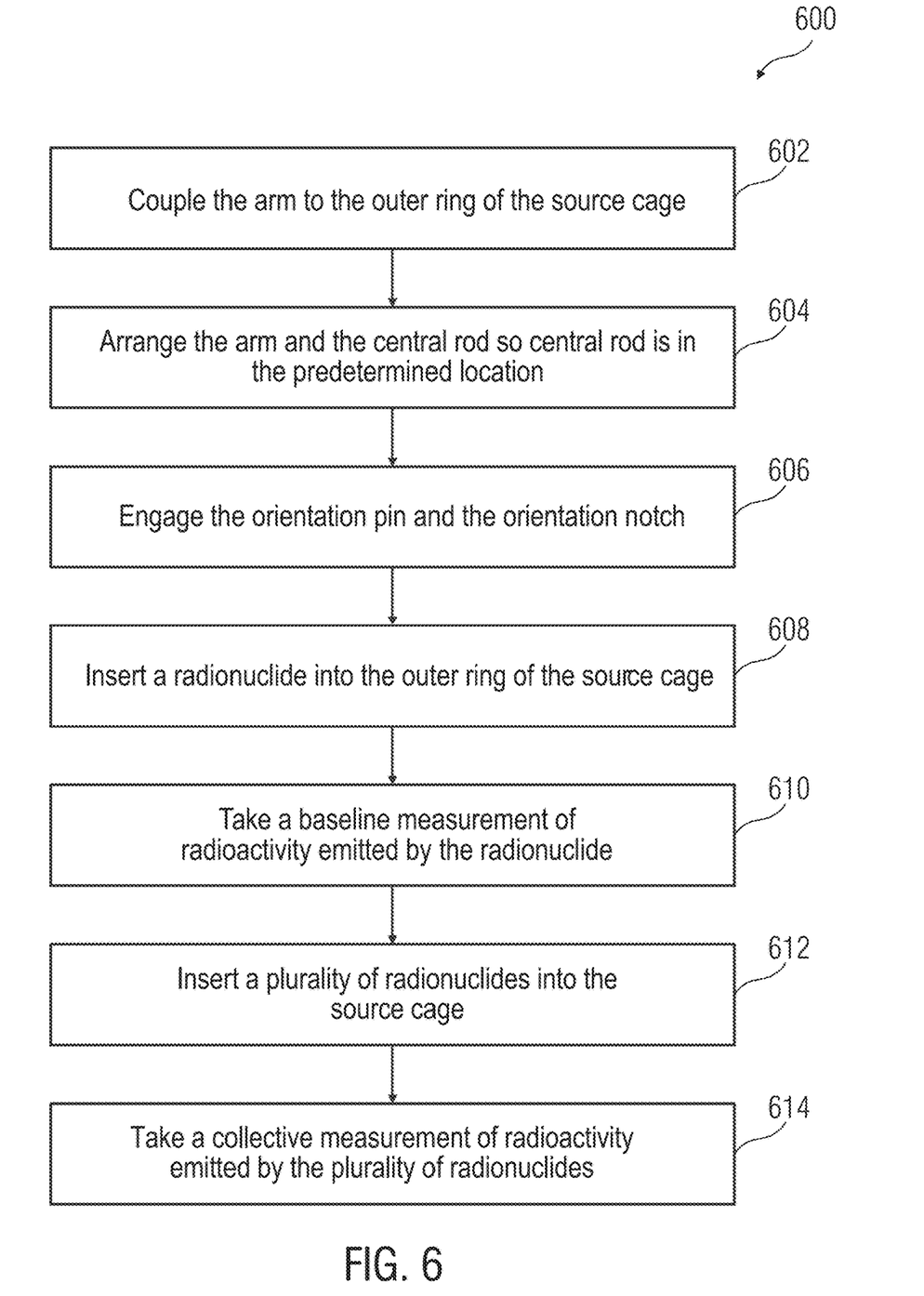
FIG. 6 illustrates a flow diagram of a method of measuring radioactivity emitted by a plurality of radionuclides using the devices depicted in FIGS. 4 and 5 in accordance with at least one non-limiting aspect of the present disclosure.

Referring now to FIG. 6, a flow diagram of a method 600 of measuring radioactivity emitted by a plurality of radionuclides using the devices depicted in FIGS. 4 and 5 is depicted in accordance with at least one non-limiting aspect of the present disclosure. First, a technician can couple the one or more arms of the frame to the source cage 602. As previously discussed, this can include simply securing a fixed frame on the outer ring of the source cage, or attaching an articulated frame via movable components (e.g. hinges). The technician can then arrange the arm and specifically, the central rod, until the gamma detector is in a predetermined location relative to a cylindrical volume defined by an outer ring of the source cage 604. This can include the use of a manipulating arm, as depicted in FIGS. 4 and 5. Once the frame is properly aligned relative to the source cage, the technician can engage the orientation pin of the frame and the orientation notch of the source cage 606. Of course, the device can include alternate components for initial alignment and coupling, as disclosed above. This will ensure that the gamma detector is properly positioned and secure for testing.

In further reference of FIG. 6, once the gamma detector s initially positioned, the technician can install a single radionuclide of a plurality of radionuclides into the source cage. 608. Once installed, the technician can take a baseline measurement of the radioactivity emitted by the single radionuclide 610 and. can proceed to install each radionuclide to be shipped into the source cage 612. The technician can then take a collective measurement of radioactivity emitted by the entire shipment of radionuclides 614. The technician can then compare the collective measurement to the baseline measurement and determine a correction factor based, at least in part, on the comparison. For example, if the baseline measurement of the single radionuclide was one Curie, the technician might expect that the collective measurement would be 48 Curies. However, if the collective measurement significantly diverges from the what would be expected based on the baseline measurement, the technician might determine a correction factor, which can account for an acceptable margin of error. Accordingly, the technician might decide to reposition the gamma detector within the cylindrical volume based, at least in part, on the determined correction factor. Without following the aforementioned steps of method 600, the technician would be forced to measure each radionuclide on a one-by-one basis, which is as costly as it is time-consuming. However, by following the aforementioned steps of the method 600, the technician can easily measure and adjustment the method of measurement and therefore, can efficiently acquire accurate data associated with the anticipated shipment.

Figure 7:
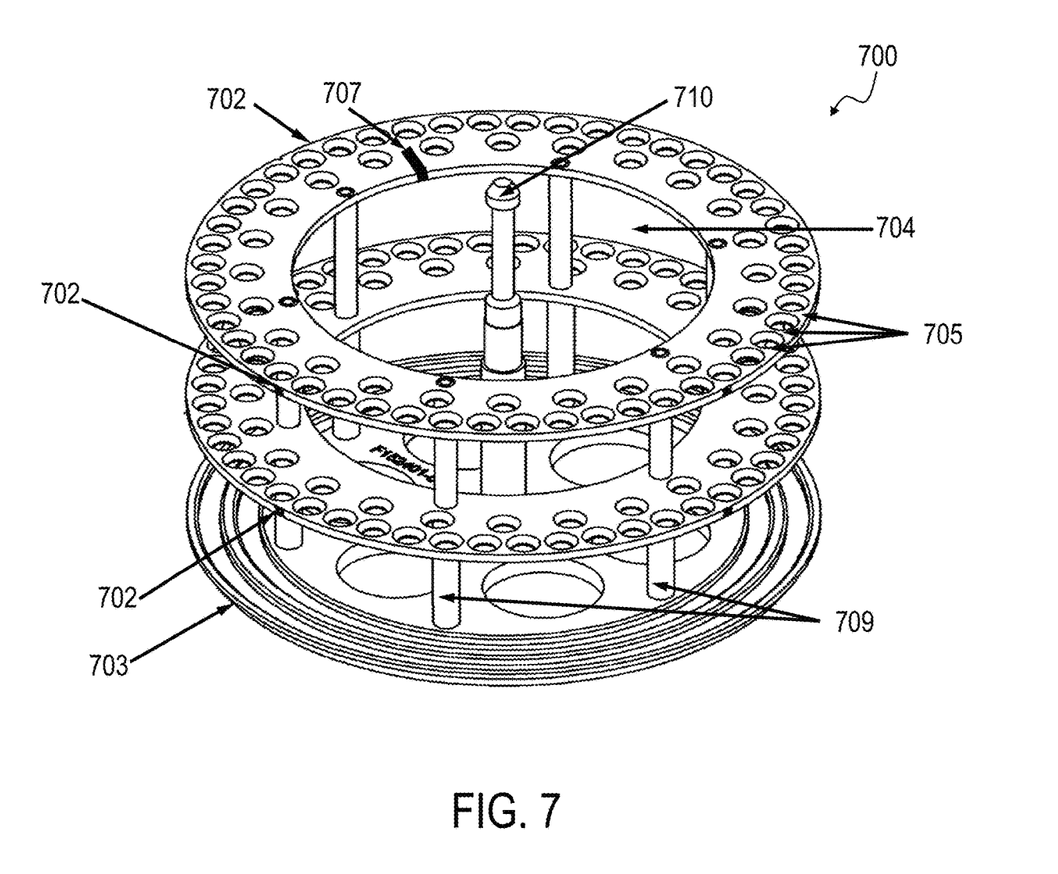
FIG. 7 illustrates a perspective view of another source cage of a device configured to measure radioactivity emitted by a plurality of radionuclides in bulk, in accordance with at least one non-limiting aspect of the present disclosure.

Referring now to FIG. 7, a perspective view of another source cage 700 of a device configured to measure radioactivity emitted by a plurality of radionuclides in bulk is depicted in accordance with at least one non-limiting aspect of the present disclosure. The source cage 700 of FIG. 7 is similarly configured to the source cage 100 of FIG. 1. However, according to the non-limiting aspect of FIG. 7, the source cage 700 can further include a geometrical feature 710 positioned within the volume 704 defined by the outer rings 702 of the source cage 700. For example, the source cage 700 of FIG. 7 includes a base plate 703 coupled to the standoff rods 709 of the source cage 700, and the geometrical feature 710 includes a centerpiece extending up from the base plate 703 into the volume 704, where the central rod 208 (FIG. 2) of the frame 200 (200) could otherwise be positioned. Accordingly, a gamma detector—such as an ion chamber detector 207 (FIG. 2) —can be suspended above the cylindrical volume 704 via a central rod 512 (FIG. 5) of a frame 500 (FIG. 5). Alternatively and/or additionally a gamma detector—such as a self-powered detector 302 (FIG. 3) —can be strategically positioned about the centerpiece 710, in accordance with the intended application and/or user preference.

Various aspects of the subject matter described herein are set out in the following numbered clauses:

Clause 1: A device configured to measure radioactivity emitted by a plurality of radionuclides, the device including a gamma detector configured to measure the radioactivity emitted by the plurality of radionuclides, a source cage including an outer ring that defines a volume, wherein the outer ring includes a plurality of holes, wherein each hole of the plurality of holes is configured to receive a radionuclide of the plurality of radionuclides, and wherein the outer ring further includes an orientation feature; and a frame including: an arm configured to be coupled to the outer ring of the source cage, wherein the arm includes an orientation pin; and a central rod coupled to the arm, wherein the central rod is configured to be positioned relative to the volume of the source cage when the arm is coupled to the outer ring of source cage; wherein the orientation feature of the source cage is configured to engage orientation pin of the arm, and wherein the central rod is positioned in a predetermined location relative to the volume when the orientation pin engages the orientation feature.

Clause 2: The device according to clause 1, wherein the gamma detector is coupled to the central rod.

Clause 3: The device according to clauses 1 or 2, wherein the gamma detector further includes a gamma shield configured to reduce a quantity of radioactivity emitted by the gamma detector.

Clause 4: The device according to any of clauses 1-3, wherein the frame further includes a second arm coupled to the central rod, wherein the arm and the second arm are movably coupled to the outer ring, wherein the arm and the second arm are movable between a first position relative to the source cage and a second position relative to the source cage, wherein the central rod is positioned in the predetermined location relative to the volume when the arm and the second arm are in the first position, and wherein the central rod is positioned in a second predetermined location relative to the volume when the arm and the second arm are in the second position.

Clause 5: The device according to any of clauses 1-4, wherein the gamma detector includes a farmer ion chamber.

Clause 6: The device according to any of clauses 1-5, further including a housing configured to be coupled to the central rod, wherein the farmer ion chamber is coupled to a top side of the housing, and wherein the gamma detector is oriented in the center of the volume when the housing is coupled to central rod.

Clause 7: The device according to any of clauses 1-6, wherein source cage comprises a geometrical feature positioned within the volume, wherein the gamma detector is coupled to the geometrical feature, and wherein the gamma detector comprises a self-powered detector.

Clause 8: The device according to any of clauses 1-7, wherein the gamma detector comprises a self-powered detector, and wherein the self-powered detector comprises a spiral wound around the geometrical feature of the source cage.

Clause 9: The device according to any of clauses 1-8, further including a sleeve configured to couple the gamma detector to the central rod.

Clause 10: The device according to any of clauses 1-9, further including a manipulating arm including a length, wherein the manipulating arm is configured to allow a technician to engage the orientation pin and the orientation feature, and wherein the length is specifically configured to position the technician a predetermined distance away from the plurality of radionuclides.

Clause 11: A method of measuring radioactivity emitted by a plurality of radionuclides using a source cage including an outer ring that defines a volume and a plurality of holes, wherein each hole of the plurality of holes is configured to receive a radionuclide of the plurality of radionuclides, and a frame including an arm coupled to a central rod, wherein the central rod is coupled to a gamma detector, wherein the outer ring includes a orientation feature, wherein the arm includes an orientation pin configured to engage the orientation feature, and wherein the central rod is configured to be positioned in a predetermined location relative to the volume when the orientation pin and the orientation feature are engaged, the method including: coupling the arm to the outer ring of the source cage; arranging the arm and the central rod until the central rod is be positioned in the predetermined location relative to the volume; engaging the orientation pin of the arm and the orientation feature of the outer ring of the source cage; inserting a radionuclide of the plurality of radionuclides into a hole of the plurality of holes of the outer ring of the source cage; taking a baseline measurement of radioactivity emitted by the inserted radionuclide using the gamma detector; removing the radionuclide of the plurality of radionuclides from the hole of the plurality of holes of the outer ring of the source cage; inserting each radionuclide of the plurality of radionuclides into the plurality of holes of the outer ring of the source cage; taking a collective measurement of radioactivity emitted by the plurality of radionuclides; and dividing the collective measurement by the number of radionuclides of the plurality of radionuclides to determine an average measurement of radioactivity emitted by each radionuclide of the plurality of radionuclides.

Clause 12: The method according to clause 11, further including: comparing the average measurement of radioactivity emitted by each radionuclide of the plurality of radionuclides to an estimated measurement of radioactivity emitted by each radionuclide of the plurality of radionuclides; determining a correction factor based, at least in part, on the comparison of the average measurement of radioactivity emitted by each radionuclide of the plurality of radionuclides to the estimated measurement of radioactivity emitted by each radionuclide of the plurality of radionuclides; and determining a second predetermined location based, at least in part, on the determined correction factor.

Clause 13: The method according to clauses 11 or 12, further including: disengaging the orientation pin of the arm and the orientation feature of the outer ring of the source cage; rearranging the arm and the central rod until the central rod is positioned in the second predetermined location relative to the volume; taking a correction measurement of radioactivity emitted by the plurality of radionuclides; and dividing the correction measurement by the number of radionuclides of the plurality of radionuclides to determine a corrected average measurement of radioactivity emitted by each radionuclide of the plurality of radionuclides.

Clause 14: The method according to any of clauses 11-13, wherein the frame further includes a second arm coupled to the central rod, wherein the arm and the second arm are configured to be movably coupled to the outer ring, wherein the arm and the second arm are movable between a first position relative to the source cage and a second position relative to the source cage, the method further including: coupling the second arm to the outer ring of the source cage; and rearranging the arm and the second arm from the first position to the second position until the central rod is positioned in the second predetermined location relative to the volume; taking a correction measurement of radioactivity emitted by the plurality of radionuclides; and dividing the correction measurement by the number of radionuclides of the plurality of radionuclides to determine a corrected average measurement of radioactivity emitted by each radionuclide of the plurality of radionuclides.

Clause 15: The method according to any of clauses 11-14, further including submerging the source cage in a fluid, and wherein arranging the arm and the central rod further includes using a manipulating arm configured to allow a technician to engage the orientation pin and the orientation feature from a predetermined distance away from the plurality of radionuclides.

Clause 16: A device configured to measure radioactivity emitted by a plurality of radionuclides coupled to a source cage that defines a volume, wherein the source cage includes an orientation feature, the device including: an arm configured to be coupled to the source cage, wherein the arm includes an orientation component that corresponds to the orientation feature of the source cage; and a central rod coupled to the arm, wherein the central rod is configured to be coupled to a gamma detector configured to measure the radioactivity emitted by the plurality of radionuclides, and wherein the central rod is configured to be positioned relative to the volume of the source cage when the arm is coupled to the source cage; wherein the orientation feature of the source cage is indicative of a predetermined location relative to the orientation component on the source cage, and wherein the predetermined location relative to the orientation component on the source cage corresponds to a predetermined location relative to the central rod relative to the volume.

Clause 17: The device according to clause 16, further including a gamma detector coupled to the central rod, wherein the gamma detector is configured to measure the radioactivity emitted by the plurality of radionuclides.

Clause 18: The device according to clause 16 or 17, further including a second arm coupled to the central rod, wherein the arm and the second arm are movably coupled to the source cage, wherein the arm and the second arm are movable between a first position relative to the source cage and a second position relative to the source cage, wherein the central rod is positioned in the predetermined location relative to the volume when the arm and the second arm are in the first position, and wherein the central rod is positioned in a second predetermined location relative to the volume when the arm and the second arm are in the second position.

Clause 19: The device according to clauses 16-18, further including a manipulating arm including a length, wherein the manipulating arm is configured to allow a technician to align the orientation component relative to the orientation feature, and wherein the length is specifically configured to position the technician a predetermined distance away from the plurality of radionuclides.

Clause 20: The method according to clauses 16-19, wherein the gamma detector includes a spiral wound around a tube configured to be coupled to the central rod.

All patents, patent applications, publications, or other disclosure material mentioned herein, are hereby incorporated by reference in their entirety as if each individual reference was expressly incorporated by reference respectively. All references, and any material, or portion thereof, that are said to be incorporated by reference herein are incorporated herein only to the extent that the incorporated material does not conflict with existing definitions, statements, or other disclosure material set forth in this disclosure. As such, and to the extent necessary, the disclosure as set forth herein supersedes any conflicting material incorporated herein by reference and the disclosure expressly set forth in the present application controls.

The present invention has been described with reference to various exemplary and illustrative aspects. The aspects described herein are understood as providing illustrative features of varying detail of various aspects of the disclosed invention; and therefore, unless otherwise specified, it is to be understood that, to the extent possible, one or more features, elements, components, constituents, ingredients, structures, modules, and/or aspects of the disclosed aspects may be combined, separated, interchanged, and/or rearranged with or relative to one or more other features, elements, components, constituents, ingredients, structures, modules, and/or aspects of the disclosed aspects without departing from the scope of the disclosed invention. Accordingly, it will be recognized by persons having ordinary skill in the art that various substitutions, modifications or combinations of any of the exemplary aspects may be made without departing from the scope of the invention. In addition, persons skilled in the art will recognize, or be able to ascertain using no more than routine experimentation, many equivalents to the various aspects of the invention described herein upon review of this specification. Thus, the invention is not limited by the description of the various aspects, but rather by the claims.

Those skilled in the art will recognize that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although claim recitations are presented in a sequence(s), it should be understood that the various operations may be performed in other orders than those which are described, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

It is worthy to note that any reference to "one aspect," "an aspect," "an exemplification," "one exemplification," and the like means that a particular feature, structure, or characteristic described in connection with the aspect is included in at least one aspect. Thus, appearances of the phrases "in one aspect," "in an aspect," "in an exemplification," and "in one exemplification" in various places throughout the specification are not necessarily all referring to the same aspect. Furthermore, the particular features, structures or characteristics may be combined in any suitable manner in one or more aspects.

As used herein, the singular form of "a", "an", and "the" include the plural references unless the context clearly dictates otherwise.

Directional phrases used herein, such as, for example and without limitation, top, bottom, left, right, lower, upper, front, back, and variations thereof, shall relate to the orientation of the elements shown in the accompanying drawing and are not limiting upon the claims unless otherwise expressly stated.

The terms "about" or "approximately" as used in the present disclosure, unless otherwise specified, means an acceptable error for a particular value as determined by one of ordinary skill in the art, which depends in part on how the value is measured or determined. In certain aspects, the term "about" or "approximately" means within 1, 2, 3, or 4 standard deviations. In certain aspects, the term "about" or "approximately" means within 50%, 200%, 105%, 100%, 9%, 8%, 7%, 6%, 5%, 4%, 3%, 2%, 1%, 0.5%, or 0.05% of a given value or range.

In this specification, unless otherwise indicated, all numerical parameters are to be understood as being prefaced and modified in all instances by the term "about," in which the numerical parameters possess the inherent variability characteristic of the underlying measurement techniques used to determine the numerical value of the parameter. At the very least, and not as an attempt to limit the application of the doctrine of equivalents to the scope of the claims, each numerical parameter described herein should at least be construed in light of the number of reported significant digits and by applying ordinary rounding techniques.

Any numerical range recited herein includes all sub-ranges subsumed within the recited range. For example, a range of "1 to 100" includes all sub-ranges between (and including) the recited minimum value of 1 and the recited maximum value of 100, that is, having a minimum value equal to or greater than 1 and a maximum value equal to or less than 100. Also, all ranges recited herein are inclusive of the end points of the recited ranges. For example, a range of "1 to 100" includes the end points 1 and 100. Any maximum numerical limitation recited in this specification is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited. All such ranges are inherently described in this specification.

Any patent application, patent, non-patent publication, or other disclosure material referred to in this specification and/or listed in any Application Data Sheet is incorporated by reference herein, to the extent that the incorporated materials is not inconsistent herewith. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system that "comprises," "has," "includes" or "contains" one or more elements possesses those one or more elements, but is not limited to possessing only those one or more elements. Likewise, an element of a system, device, or apparatus that "comprises," "has," "includes" or "contains" one or more features possesses those one or more features, but is not limited to possessing only those one or more features.

What is claimed is:

1. A device configured to measure radioactivity emitted by a plurality of radionuclides, the device comprising:
   a gamma detector configured to measure the radioactivity emitted by the plurality of radionuclides;
   a source cage comprising an outer ring that defines a volume, wherein the outer ring comprises a plurality of holes, wherein each hole of the plurality of holes is configured to receive a radionuclide of the plurality of radionuclides, wherein the outer ring further comprises an orientation feature; and
   a frame comprising:
      an arm configured to be coupled to the outer ring of the source cage, wherein the arm comprises an orientation pin; and
      a central rod coupled to the arm, wherein the central rod is configured to be positioned relative to the volume of the source cage when the arm is coupled to the outer ring of source cage;
   wherein the orientation feature of the source cage is configured to engage orientation pin of the arm, and wherein the central rod is positioned in a predetermined location relative to the volume when the orientation pin engages the orientation feature.

2. The device of claim 1, wherein the gamma detector is coupled to the central rod.

3. The device of claim 2, wherein the gamma detector further comprises a gamma shield configured to reduce a quantity of radioactivity emitted by the gamma detector.

4. The device of claim 2, wherein the frame further comprises a second arm coupled to the central rod, wherein the arm and the second arm are movably coupled to the outer ring, wherein the arm and the second arm are movable between a first position relative to the source cage and a second position relative to the source cage, wherein the central rod is positioned in the predetermined location relative to the volume when the arm and the second arm are in the first position, and wherein the central rod is positioned in a second predetermined location relative to the volume when the arm and the second arm are in the second position.

5. The device of claim 2, wherein the gamma detector comprises a farmer ion chamber.

6. The device of claim 5, further comprising a housing configured to be coupled to the central rod, wherein the farmer ion chamber is coupled to a top side of the housing, and wherein the gamma detector is oriented in the center of the volume when the housing is coupled to central rod.

7. The device of claim 2, further comprising a sleeve configured to couple the gamma detector to the central rod.

8. The device of claim 2, further comprising a manipulating arm comprising a length, wherein the manipulating arm is configured to allow a technician to engage the orientation pin and the orientation feature, and wherein the length is specifically configured to position the technician a predetermined distance away from the plurality of radionuclides.

9. The device of claim 1, wherein source cage comprises a geometrical feature positioned within the volume, wherein the gamma detector is coupled to the geometrical feature, and wherein the gamma detector comprises a self-powered detector.

10. The device of claim 9, wherein the gamma detector comprises a self-powered detector, and wherein the self-powered detector comprises a spiral wound around the geometrical feature of the source cage.

11. A method of measuring radioactivity emitted by a plurality of radionuclides using a source cage comprising an outer ring that defines a volume and a plurality of holes, wherein each hole of the plurality of holes is configured to receive a radionuclide of the plurality of radionuclides, and a frame comprising an arm coupled to a central rod, wherein the central rod is coupled to a gamma detector, wherein the outer ring comprises a orientation feature, wherein the arm comprises an orientation pin configured to engage the orientation feature, and wherein the central rod is configured to be positioned in a predetermined location relative to the volume when the orientation pin and the orientation feature are engaged, the method comprising:
coupling the arm to the outer ring of the source cage;
arranging the arm and the central rod until the central rod is be positioned in the predetermined location relative to the volume;
engaging the orientation pin of the arm and the orientation feature of the outer ring of the source cage;
inserting a radionuclide of the plurality of radionuclides into a hole of the plurality of holes of the outer ring of the source cage;
taking a baseline measurement of radioactivity emitted by the inserted radionuclide using the gamma detector;
removing the radionuclide of the plurality of radionuclides from the hole of the plurality of holes of the outer ring of the source cage;
inserting each radionuclide of the plurality of radionuclides into the plurality of holes of the outer ring of the source cage;
taking a collective measurement of radioactivity emitted by the plurality of radionuclides; and
dividing the collective measurement by the number of radionuclides of the plurality of radionuclides to determine an average measurement of radioactivity emitted by each radionuclide of the plurality of radionuclides.

12. The method of claim 11, further comprising:
comparing the average measurement of radioactivity emitted by each radionuclide of the plurality of radionuclides to an estimated measurement of radioactivity emitted by each radionuclide of the plurality of radionuclides;
determining a correction factor based, at least in part, on the comparison of the average measurement of radioactivity emitted by each radionuclide of the plurality of radionuclides to the estimated measurement of radioactivity emitted by each radionuclide of the plurality of radionuclides; and
determining a second predetermined location based, at least in part, on the determined correction factor.

13. The method of claim 12, further comprising:
disengaging the orientation pin of the arm and the orientation feature of the outer ring of the source cage;
rearranging the arm and the central rod until the central rod is positioned in the second predetermined location relative to the volume;
taking a correction measurement of radioactivity emitted by the plurality of radionuclides; and
dividing the correction measurement by the number of radionuclides of the plurality of radionuclides to determine a corrected average measurement of radioactivity emitted by each radionuclide of the plurality of radionuclides.

14. The method of claim 12, wherein the frame further comprises a second arm coupled to the central rod, wherein the arm and the second arm are configured to be movably coupled to the outer ring, wherein the arm and the second arm are movable between a first position relative to the source cage and a second position relative to the source cage, the method further comprising:
coupling the second arm to the outer ring of the source cage; and
rearranging the arm and the second arm from the first position to the second position until the central rod is positioned in the second predetermined location relative to the volume;
taking a correction measurement of radioactivity emitted by the plurality of radionuclides; and
dividing the correction measurement by the number of radionuclides of the plurality of radionuclides to determine a corrected average measurement of radioactivity emitted by each radionuclide of the plurality of radionuclides.

15. The method of claim 11, further comprising submerging the source cage in a fluid, and wherein arranging the arm and the central rod further comprises using a manipulating arm configured to allow a technician to engage the orientation pin and the orientation feature from a predetermined distance away from the plurality of radionuclides.

16. A device configured to measure radioactivity emitted by a plurality of radionuclides, coupled to a source cage that defines a volume, wherein the source cage comprises an orientation feature, the device comprising:
- an arm configured to be coupled to the source cage, wherein the arm comprises an orientation component that corresponds to the orientation feature of the source cage; and
- a central rod coupled to the arm, wherein the central rod is configured to be coupled to a gamma detector configured to measure the radioactivity emitted by the plurality of radionuclides, and wherein the central rod is configured to be positioned relative to the volume of the source cage when the arm is coupled to the source cage;
- wherein the orientation feature of the source cage is indicative of a predetermined location relative to the orientation component on the source cage, and wherein the predetermined location relative to the orientation component on the source cage corresponds to a predetermined location relative to the central rod relative to the volume.

17. The device of claim 16, further comprising a gamma detector coupled to the central rod, wherein the gamma detector is configured to measure the radioactivity emitted by the plurality of radionuclides.

18. The device of claim 17, further comprising a second arm coupled to the central rod, wherein the arm and the second arm are movably coupled to the source cage, wherein the arm and the second arm are movable between a first position relative to the source cage and a second position relative to the source cage, wherein the central rod is positioned in the predetermined location relative to the volume when the arm and the second arm are in the first position, and wherein the central rod is positioned in a second predetermined location relative to the volume when the arm and the second arm are in the second position.

19. The device of claim 17, further comprising a manipulating arm comprising a length, wherein the manipulating arm is configured to allow a technician to align the orientation component relative to the orientation feature, and wherein the length is specifically configured to position the technician a predetermined distance away from the plurality of radionuclides.

20. The device of claim 17, wherein the gamma detector comprises a spiral wound around a tube configured to be coupled to the central rod.

* * * * *